Sept. 6, 1949.  C. PESCHKE  2,480,956
OVERHEAD TROLLEY CONVEYER
Filed June 29, 1945
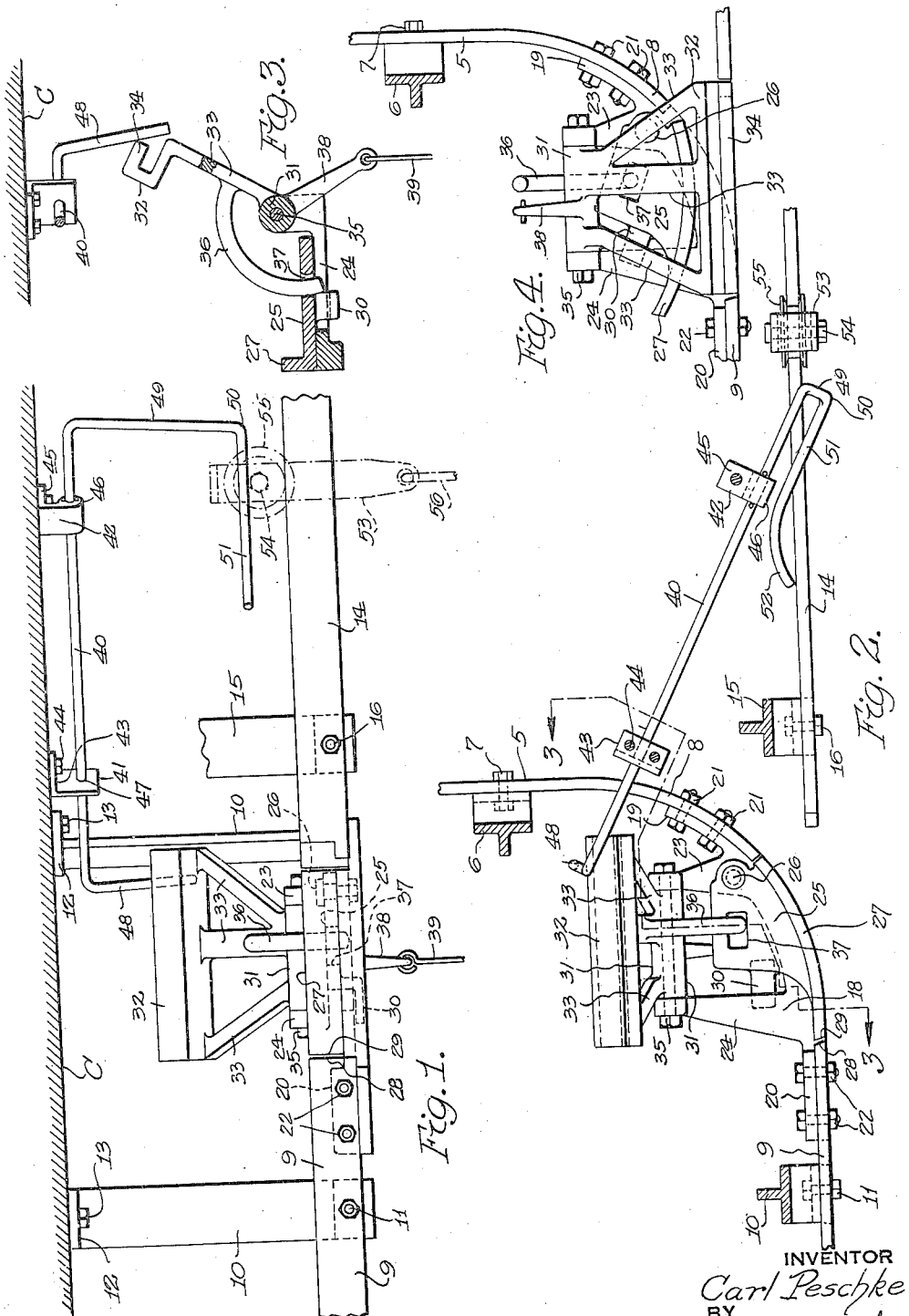
INVENTOR
Carl Peschke
BY
Barthel & Bugbee
ATTORNEYS Patented Sept. 6, 1949

2,480,956

UNITED STATES PATENT OFFICE 2,480,956

OVERHEAD TROLLEY CONVEYER

Carl Peschke, Detroit, Mich.

Application June 29, 1945, Serial No. 602,187

2 Claims. (Cl. 104—100)

The present invention relates to single rail type trolley conveyors and more particularly, to an automatic switch mechanism and control means therefor.

The primary object of the invention is to provide a switch mechanism and automatic operating mechanism therefor which is operated by the trolley of said conveyor when the trolley passes a predetermined position so as to prevent the trolley from being displaced from the trolley rail when the switch is open.

Another object of the invention is to provide an automatically operated tripping mechanism for a trolley conveyor switch to prevent displacement of the trolley of said conveyor when one of the branch extensions of said trolley conveyor is used.

A still further object of the invention is to provide a trolley conveyor switch tripping member which will be automatically operated in the event one of the branch lines of the trolley conveyor is used and to provide means for manually resetting the switch after the trolley has passed over said switch.

Another object of the invention is to provide a tripping device for trolley conveyor switches of the overhead single rail type which has one of its ends shaped to provide a trolley engaging portion and its other end fashioned to engage one of the switch members of said trolley conveyor switch so that upon engagement of the trolley member with said one end of the tripping device, the other end will be displaced to release the switch member and permit the same to fall by gravity into position and thereby bridge or span the space between the separated ends of the trolley rail.

Other objects and advantages of the invention will become apparent during the course of the following description of the accompanying drawing, wherein:

Figure 1 is a fragmentary side elevational view of the switch mechanism and tripping device embodying the invention;

Figure 2 is a top plan view of the trolley conveyor structure illustrating the manner in which the tripping device is arranged and showing the position thereof relative to the switch mechanism and trolley prior to engagement of the same with the tripping device;

Figure 3 is a vertical cross-sectional view taken on the irregular line 3—3 of Figure 2 looking in the direction of the arrows and illustrating the position of the switch engaging end of the tripping device when the switch member is retained in one of its positions; and Figure 4 is a top plan view of the switch mechanism after the same has been tripped or forced to its operative position.

In the drawing, the reference character 5 will generally be employed to designate an overhead trolley beam which is supported by suitable suspension brackets 6 equidistantly spaced thereon and secured in place by bolts or the like as at 7. One end of the trolley beam 5 is arcuately curved as at 8 and the trolley beam 5 may comprise the feeder line of an overhead conveyor system or one of the main lines thereof.

Arranged at right angles to the main line trolley beam 5 is a trolley beam 9 which is likewise suspended from the ceiling or other support C by means of trolley suspension brackets 10 which have their lower ends bent upon themselves for being fastened to the trolley beam 9 by means of bolts or the like as at 11. The upper ends of the brackets 6 and 10 are provided with angle portions 12 for being secured in place by screws or the like as at 13.

Extending parallel with the trolley beam 9 and in alignment therewith is an auxiliary trolley beam 14 which is supported by trolley suspension brackets 15 arranged in spaced apart relation and provided at their lower ends with return bent portions for being fastened to the trolley beam 14 by bolts or the like as at 16. The trolley beam 14 is arranged with respect to the trolley beam 5 as shown in Figure 2 and has its ends terminating in spaced relation from the end of the trolley beam 9 and tangential to the radius of the arcuately curved portion 8 of the trolley beam 5.

A switch supporting bracket 18 is mounted between the trolley beams 5 and 9 and is provided with flange portions 19 and 20 for being secured to said trolley beams by means of bolts or the like as at 21 and 22 respectively. Formed integral with the switch supporting bracket 18 and extending in a horizontal direction is a pair of bracket arms 23 and 24 for oscillatably receiving and supporting a trolley section for interposition between the ends of the trolley beams 9 and 14 in a manner which will be hereinafter more fully described.

Pivotally secured to the arm 23 is a switch plate 25 as at 26 and said switch plate is provided with an upstanding flange portion 27 which is arcuately curved on the same radius as the arcuately curved portion 8 of the trolley beam 5 so that when said switch plate 25 is in the position shown in Figure 2, the upstanding flange 27 will form a continuation of the trolley beam 5 as well as the trolley beam 9. The mating edges of the trolley beam 9 and upstanding flange 27 are scarfed as at 28 and 29 respectively to provide an interfitting joint and yet permit the swinging movement of the switch plate 25 on the pivot point of pin 26. Extending downwardly and laterally from the underside of the switch plate 25 is a lug projection 30 having its free end arranged beneath the bracket arm 24 so as to retain the switch plate 25 in position, against vertical movement and displacement.

Pivotally mounted between the free ends of the bracket arms 23 and 24 is the hub 31 of a switch section 32 which is supported from the hub portion 31 by radially extending arms 33. The switch section 32 is of U-shaped cross-section as illustrated in Figure 3 to provide an upstanding flange portion 34 adapted to extend between the ends of the trolley beams 9 and 14 when the switch section is swung to the position shown in Figure 4. A bolt or shaft 35 is passed through suitable bearing openings in the free ends of the bracket arms 23 and 24 and extends through the bearing opening in the hub 31 so as to pivotally mount the straight switch sections 32 on an axis at right angles to the pivotal movement of the switch plate 25.

One of the radially extending arms 33 of the straight trolley switch section 32 is provided with an arcuately curved arm portion 36 which is adapted to pass through an opening 37 in the switch plate 25 for the purpose of retracting and projecting said switch plate when the straight switch section 32 is moved into and out of position between the free ends of the trolley beams 9 and 14.

Formed integral with the hub 31 of the oscillatable straight trolley beam section 32 is a lever 38 which is provided with a pull rod or the like as at 39 which is manually operated to elevate the straight trolley beam switch section 32 when it is desired to again establish a trolley surface between the trolley beams 5 and 9.

It is to be noted that the arcuately curved arm 36 has various portions thereof on different radii with respect to the shaft 35 so that when the straight trolley beam switch section 32 is raised and lowered, it will automatically operate and swing the switch plate 25 on the pivot pin 26.

In order to swing the straight trolley switch section 32 into position, a tripping member is provided and includes an oscillatable shaft 40 suspended from the ceiling C by means of suitable bearing brackets 41 and 42. The bearing bracket 41 has its flange portion 43 affixed to the ceiling by means of a bolt or screw 44 and the bearing bracket 42 likewise has its angle portion 45 secured to the ceiling C by means of a similar bolt and has formed at the opposite end thereof a bearing boss 46 for receiving the shaft 40. The bearing bracket 41 is provided with a bearing opening 47 for accommodating the shaft 40 and said shaft and bearing bracket are arranged at an angle with respect to the trolley beam 14 so that one end thereof as at 48 will extend downwardly and engage the straight trolley switch section 32. The other end of the shaft 40 is bent downwardly as at 49 and is again bent as at 50 to provide parallel arm portion 51 which terminates in a curved trolley carriage engaging portion 52.

The conveyor trolley is generally indicated in dotted lines in Figure 1 and may include a strap bracket 53 having the upper end thereof return bent for accommodating a pulley pin 54 upon which is rotatably mounted a pulley or trolley wheel 55. The trolley wheel 55 is grooved to receive the trolley beams in the usual manner and the trolley carriage may be provided with a hook or the like 56 at the lower end thereof for supporting baskets, meat carcasses and other carriers for meat commodities and the like.

In operation, the conveyor trolley or one similar thereto may pass along the trolley beams 5 and 9 from a predetermined station or location to a terminal in the end of the trolley beam 9, when the switch parts are in their position as shown in Figures 1 and 2. Should it be desirable to convey material along the trolley beam 14 from a branch station to the terminal end of the trolley beam 9, the conveyor trolley 53 is rolled along the trolley beam 14 until the upper end thereof engages the arcuately curved free end portion 52 of the parallel shaft portion 51 of said tripping device. As this occurs, the shaft 40 will be rocked about its axis so that the depending portion 48 at the end thereof will be swung in a direction to urge the straight trolley beam section 32 on the other side of the center so that the same will fall by gravity and finally come to rest between the trolley beams 9 and 14. As the straight trolley beam section 32 has thus been moved into position, the arcuately curved trolley beam section 36 thereof will retract the switch plate 25 and cause the same to be swung into position as shown in Figure 4. After the trolley conveyor 53 has passed over the straight trolley beam section 32, the same is elevated to restore the connection between the trolley beams 5 and 9 by exerting a downward pull on the manual control rod 39 to thereby elevate the straight conveyor trolley switch section 32. It will thus be seen that carriers may be conveyed along the overhead trolley beam in such a manner as to prevent the trolley of the conveyor trolley from riding off the trolley beam 14 and falling to the floor.

It is to be understood that the form of the invention herewith shown and described is to be taken as a preferred embodiment thereof and that various changes may be made in the shape, size and arrangement of parts without departing from the spirit of the invention or the scope of the subjoined claims.

What I claim is:

1. A switch-throwing mechanism for a trolley conveyor having main and tributary trolley rails and switch means arranged to alternately connect said tributary trolley rails with the main trolley rail, said switch-throwing mechanism comprising a rotary shaft disposed with its axis of rotation substantially horizontal having a transversely projecting trolley engaging arm at one end thereof and a transversely-projecting switch throwing arm at the other end thereof engageable with said switch means, the trolley engaging arm of said shaft having an arcuately curved portion extending above said tributary rail and disposed in the path of a trolley movable along said tributary rail and engageable thereby.

2. A switch-throwing mechanism for an overhead trolley conveyor having main and tributary trolley rails and a pivoted switch structure arranged to alternately connect said tributary rails to said main rail, said switch-throwing mechanism comprising a substantially horizontally-disposed bearing structure mounted above said rails, a rotary shaft journaled in said bearing structure with its axis of rotation approximately horizontal and arranged obliquely to one of said tributary rails, a switch-throwing arm extending downward from one end of said shaft and swingably engaging said pivoted switch structure, and a trolley-engaging arm extending downward from the other end of said shaft into the path of travel of a trolley along one of said tributary rails and engageable by said trolley whereby to rotate said shaft and forcibly swing said switch structure into switching position between said main rail and one of said tributary rails.

CARL PESCHKE.

REFERENCES CITED

The following references are of record in the file of this patent:

UNITED STATES PATENTS

| Number | Name | Date |
|---|---|---|
| 849,350 | Kramer | Apr. 2, 1907 |
| 1,072,409 | Wright et al. | Sept. 2, 1913 |
| 1,449,778 | Portello | Mar. 27, 1923 |